United States Patent
Bombard et al.

(10) Patent No.: US 9,730,553 B2
(45) Date of Patent: Aug. 15, 2017

(54) FOOD SUPPORT RACK FOR GRILL

(71) Applicants: Marilyn B. Bombard, Arlington Heights, IL (US); Mario Gonzalez, Kenosha, WI (US); Gregory Foster, Chicago, IL (US)

(72) Inventors: Marilyn B. Bombard, Arlington Heights, IL (US); Mario Gonzalez, Kenosha, WI (US); Gregory Foster, Chicago, IL (US)

(73) Assignee: WEBER-STEPHEN PRODUCTS LLC, Palatine, IL (US)

( * ) Notice: Subject to any disclaimer, the term of this patent is extended or adjusted under 35 U.S.C. 154(b) by 455 days.

(21) Appl. No.: 14/294,314

(22) Filed: Jun. 3, 2014

(65) Prior Publication Data
US 2015/0342402 A1    Dec. 3, 2015

(51) Int. Cl.
A47J 37/06 (2006.01)
A47J 37/07 (2006.01)

(52) U.S. Cl.
CPC .... A47J 37/0694 (2013.01); *A47J 2037/0795* (2013.01)

(58) Field of Classification Search
CPC .............. A47J 2037/0795; A47J 37/0694
USPC .................. 211/181.1, 184; 99/448
See application file for complete search history.

(56) References Cited

U.S. PATENT DOCUMENTS

| | | | | |
|---|---|---|---|---|
| 3,096,707 A | * | 7/1963 | Mills | A47J 37/04 99/395 |
| 4,515,560 A | * | 5/1985 | Jacquemin | B65G 27/04 34/164 |
| 4,848,217 A | * | 7/1989 | Koziol | A47J 37/0694 211/181.1 |
| 4,942,862 A | * | 7/1990 | Alden | A47J 37/0694 126/337 R |
| 5,445,063 A | * | 8/1995 | Sherman | A47J 43/18 211/85.4 |
| 5,562,023 A | * | 10/1996 | Harrison | A47J 37/0704 126/337 R |
| 6,439,111 B1 | * | 8/2002 | Lu | A47J 37/0763 126/25 R |
| 7,856,970 B1 | * | 12/2010 | Brown | A47J 37/0694 126/25 R |
| D658,939 S | * | 5/2012 | Adams | D7/402 |
| D741,650 S | * | 10/2015 | Bombard | D7/409 |
| D774,356 S | * | 12/2016 | Maiorana | D7/409 |
| 2004/0007545 A1 | * | 1/2004 | Morgan | A47L 19/04 211/41.11 |
| 2004/0031478 A1 | * | 2/2004 | Gifford | A47J 37/0704 126/25 AA |
| 2008/0047916 A1 | * | 2/2008 | Klingspor | F24C 15/16 211/153 |
| 2011/0132205 A1 | * | 6/2011 | Brown | A47J 37/0694 99/450 |
| 2013/0112088 A1 | * | 5/2013 | May | A47J 37/07 99/421 H |
| 2014/0007778 A1 | * | 1/2014 | Marks | A23B 4/052 99/339 |

(Continued)

*Primary Examiner* — David Angwin
*Assistant Examiner* — Frederick Calvetti
(74) *Attorney, Agent, or Firm* — Vitale Vickrey Niro & Gasey (57) ABSTRACT

A food support rack, especially for use on a grill, the food support rack including removable and reversible food support members.

3 Claims, 7 Drawing Sheets

(56) References Cited

U.S. PATENT DOCUMENTS

2014/0053739 A1* 2/2014 Safar .................. A47J 37/0754
99/447

* cited by examiner

FOOD SUPPORT RACK FOR GRILL

FIELD OF THE INVENTION

The present inventions relate to food racks for charcoal or gas grills. Mare particularly, the present inventions relate to food racks having reversible food support members that may be easily installed in a frame and easily removed from the frame for cleaning or to accommodate different sized food.

BACKGROUND OF THE INVENTION

Grilling, both with gas and charcoal grills, has became extremely popular. Similarly, the need for useful accessories to aid in grill cooking has also increased. In particular, there is a growing desire for specialized grilling accessories that aid in the proper preparation of various foods, such, as ribs, shishkabobs and the like.

Examples of such food racks are shown and described in U.S. Pat. No. 4,942,862 to Weber-Stephen Products LLC. Among other things, that patent discloses a universal rack suitable for cooking ribs. The rack includes a frame and generally vertically upstanding food support elements. The food support elements have free ends which are inserted into holes in the sides of the frame. Food, such as ribs, may then be placed between the food support elements. However, because the food support members have free ends that are inserted into holes in the sides of the frame, they can only be used one way. In addition they may be more difficult to install and clean.

Thus, there remains a need for food rack accessories for a grill that are easy to ship and assemble, provide flexibility for various uses and which are easy to clean.

SUMMARY OF THE INVENTION

The present inventions preserve the advantages of known food racks for grills and also provide new features and advantages.

Accordingly, it is an object of the present invention to provide a food rack or support assembly for grills that is easy to clean.

It is an additional object of the present invention to provide a food support assembly for grills that includes reversible food support members.

It is another object of the present invention to provide a food support assembly for grills that includes a frame that securely yet simply supports the food support members.

It is a further object of the present invention to provide a food support assembly for grills that may be shipped disassembled and may be easily assembled for use.

Thus, the present inventions provide a food support assembly for use on a cooking surface. The assembly includes a generally rectangular frame having two parallel side members and two parallel end members, each side member including a generally vertical leg and a generally horizontal flange, wherein each horizontal flange includes a plurality of opposing slots. A plurality of food support members, each food support member having two ends, each end including at least one loop portion adapted for insertion into the opposing slots of the side members is also provided. In addition, each end of each food support member may include two loop portions, one being a top loop portion and the other being the bottom loop portion, wherein the top and bottom loop portions are adapted for engagement by the slots of the opposing side members of the frame. As a result, the food support members are reversible and easily removed from the frame for cleaning.

The present inventions also provide a food support assembly for use on a cooking surface of a grill which includes a substantially rectangular frame having two side members and two end members, each side member including a substantially vertical leg and a substantially horizontal flange, wherein each horizontal flange includes a plurality of opposing apertures. Further included is a locking rail attached and generally parallel to each side member of the frame and positioned below the horizontal flanges, each looking rail including opposing openings substantially aligned with the plurality of opposing apertures on the horizontal flanges of the frame. A plurality of food support members, each food support member having two ends, each end having at least one loop portion, wherein the apertures on the horizontal flanges and the openings on the locking rail are adapted to receive the at least one loop portion of the food support member are also provided. The food support assembly may also include apertures in the locking rail which are hook shaped to engage the at least one loop portion of the food support member. Each of the ends of each food support member may include a first loop portion and a second loop portion so that the food support member is reversible. Moreover, the apertures on the horizontal flanges may be arcuate so that the food support members may be supported at an angular orientation when installed in the frame.

The present inventions further provide for a food support assembly for use on a grill, the assembly including a rectangular frame having two sides and two ends, each of the sides including a substantially horizontal flange, wherein each horizontal flange includes a plurality of opposing apertures. Also included are a plurality of food support members, each member having two ends and each end having at least one loop portion adapted to be received in the apertures in the horizontal flanges; and a locking rail associated with the sides of the frame and positioned below the horizontal flanges, the locking rail having openings aligned with the apertures on the horizontal flanges, the apertures adapted to receive the at least one loop portion of the food support member. A first loop portion and a second loop portion may also be included on each of the food support members so that they may be reversed for use. The locking rail may be hook-shaped and the apertures on the horizontal flanges may be arcuate in other aspects of the present inventions.

Inventor's Definition of the Terms

The terms used in the claims of this patent intended to have their broadest meaning consistent with the requirements of law. Where alternative meanings are possible, the broadest meaning is intended. All words used in the claims are intended to be used in the normal customary usage of grammar and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which.

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

Figure 1:
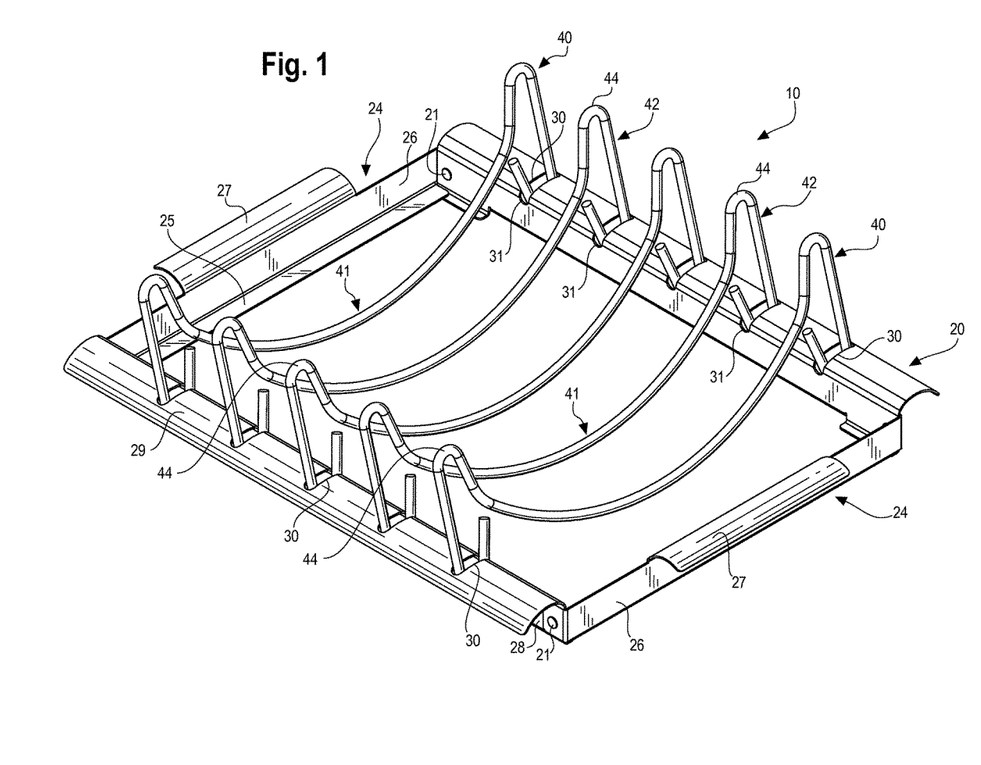
FIG. 1 is a perspective view of a preferred embodiment of a food support assembly of the present invention.
Figure 2:
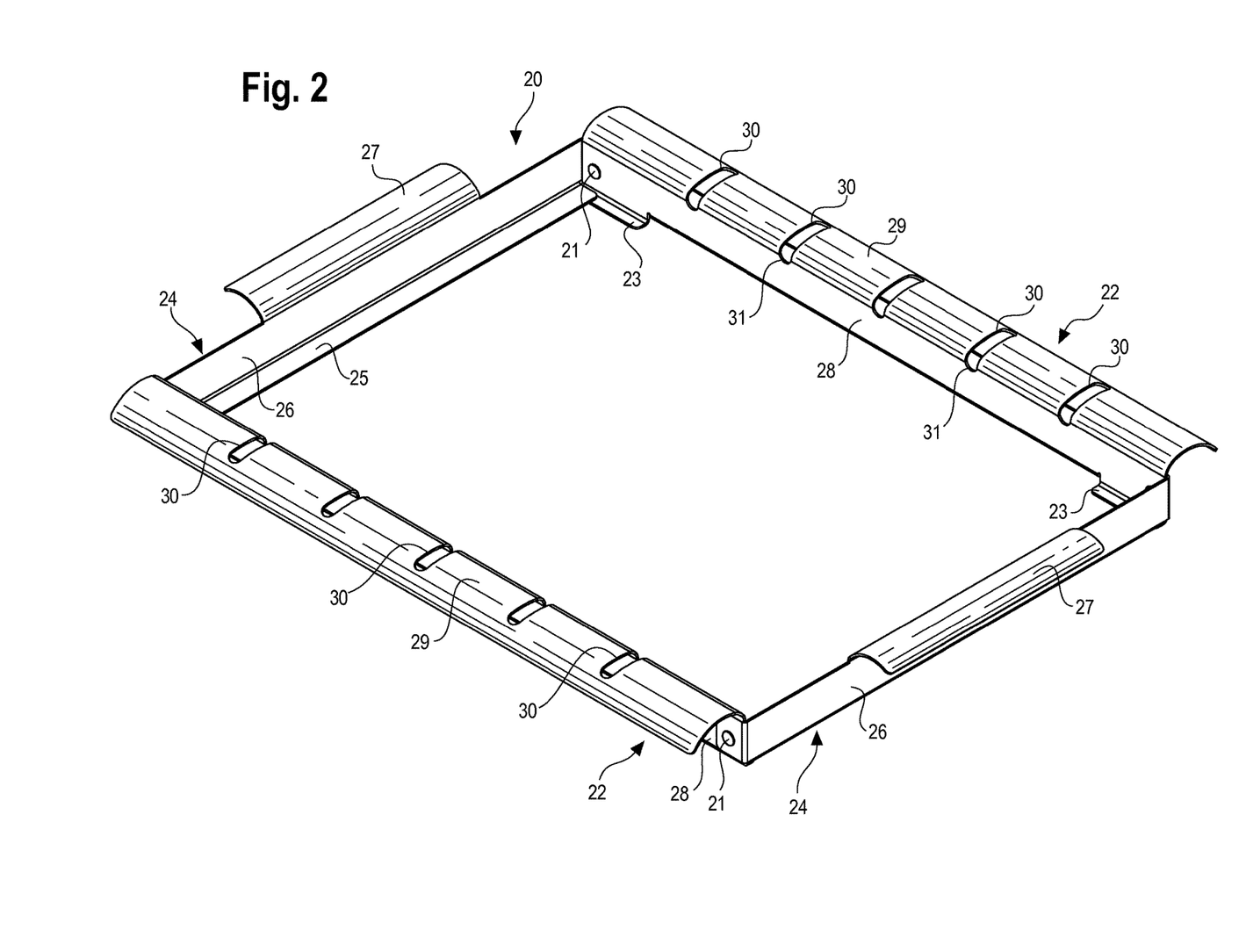
FIG. 2 is a perspective view of a frame of the embodiment of the food support assembly of FIG. 1.
Figure 3:
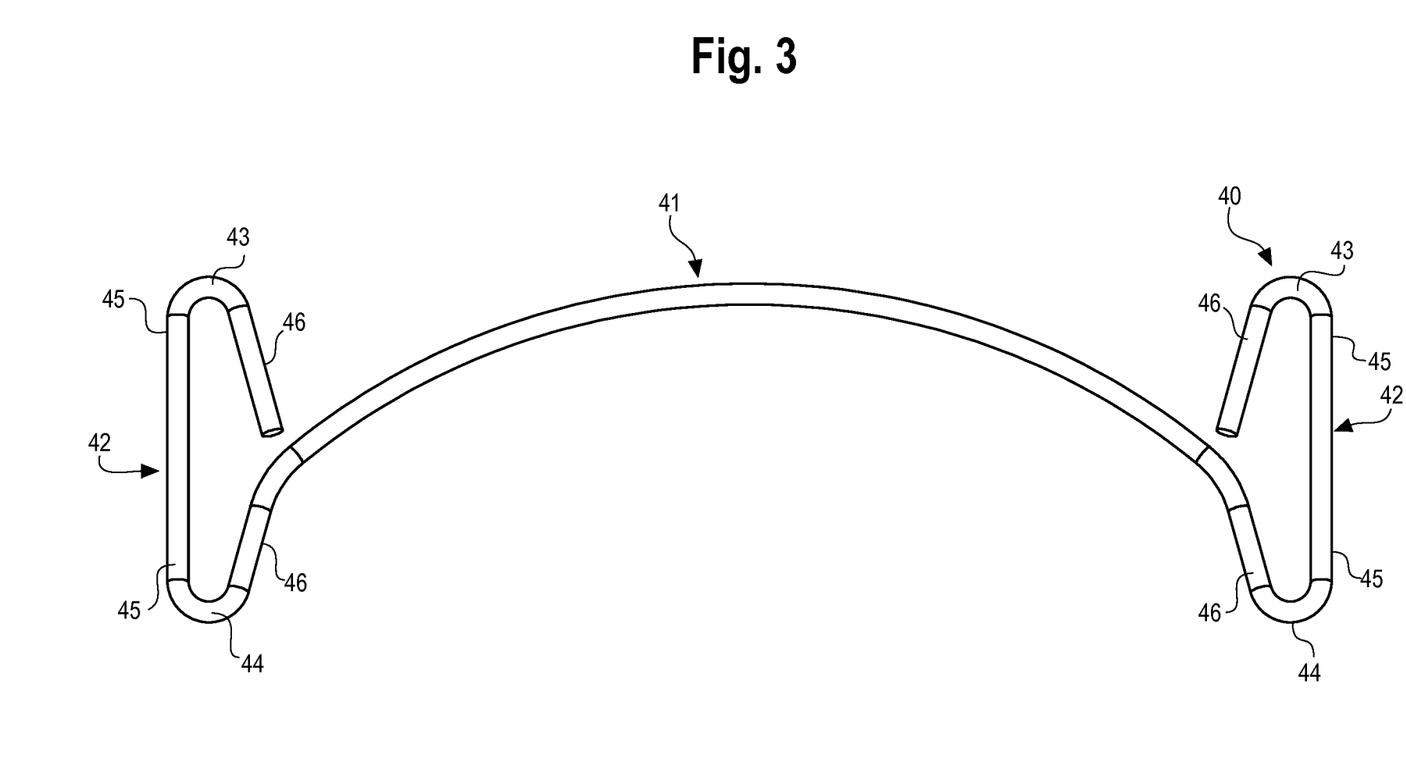
FIG. 3 is a front plan view of a preferred embodiment of a reversible food support member of the present invention.

FIGS. 1, 2 and 3 show one preferred embodiment of a food support assembly 10 of the present inventions. The food support assembly 10 includes a generally rectangular frame 20 and a plurality of food support members 40. The preferred embodiment of food support member 40 shown in FIG. 3 is reversible and may be used with the embodiment of FIGS. 1-2. It may also be used with the alternative embodiment of food support assembly 10 as shown in FIGS. 4-7 as hereinafter described. Preferred food support member 40 is reversible to accommodate different types of food and those of ordinary skill in the art will understand that a body portion 41 may take a variety of forms depending upon the anticipated use. It will also be understood by those of skill in the art that food support assembly 10 is placed upon the grate or cooking surface of a grill (not shown). In addition, food support assembly 10 and its various components may be made from a variety of materials. It will be further understood by those of skill in the art that frame 20 may be sized so accommodate any desired number and variety of food support members 40 and/or to fit within various sized grids.

The frame 20 of the embodiment shown in FIGS. 1-2 can best be seen by reference to FIG. 2. Frame 20 includes two generally parallel side members 22 and two generally parallel end members 24. Ends 24 and sides 22 are attached together using holts or rivets 21 or other well known means to form a generally rectangular frame 20. It will be understood by those of skill in the art that frame sides 22 and/or frame ends 24 may be formed from a single piece of material or may be constructed from different pieces of material that are welded or otherwise attached together. It will also be understood that frame 20 may be square or any other shape suitable to accept food support members 40. Ends 24 are generally L-shaped and include a lower horizontal flange 25 and an integral vertical end member 26. A handle 2 may be provided that is attached to or integral with vertical end member 26. Frame sides 22 preferably include a vertical leg 28 and an upper horizontal flange 29 which projects outwardly from the frame sides 22. A lower horizontal foot portion 23 may also be provided for additional stability when the food support assembly 10 is placed on a cooking surface of a grill.

In the embodiment of frame 20 in FIG. 2, upper horizontal flange 29 is integral with and/or formed as part of vertical leg 28. In addition, horizontal flange 29 is preferably curvilinear. It will be understood by those of skill in the art that vertical leg 28 and horizontal flange 29 may be formed from a single sheet of material or made from separate components which are welded or otherwise attached together. In addition, the curvilinear shape of generally horizontal flange 29 is preferred, but not required. The horizontal flanges 29 of each side frame member 22 are provided with a plurality of opposing slots 30 that are aligned with each other on the opposite flanges 29. Depending upon the configuration of food support members 40, slots 30 may extend 31 to vertical leg 28. The shape and size of slots 20 and any extension 31 to vertical leg 28 are adapted to releasably accommodate fond support members 40 as hereinafter described.

Preferred reversible food support member 40 may be seen by reference to FIG. 3. Food support member 40 includes two ends 42 and an intermediate body portion 41. Preferably, food support members 40 are formed from circular rods that are bent or deformed into the desired shape. Ends 42 are formed to preferably have two loop portions; namely, a first loop portion 43 (the top loop portion of FIG. 3) and a second loop portion 44 (the bottom loop of FIG. 3). In a preferred, embodiment body portion 41 is generally arcuate when the second loop portion 44 is on the bottom and generally U-shaped when the first loop portion 43 is on the bottom. In this manner, a user may decide which way to use reversible food support member 40 depending upon cooking needs (compare FIGS. 1 and 7). It is preferred, but not required, that ends 42 of food support member 40 include both the first and second loop portions 43 and 44. Thus, it is preferred but not required that food support member 40 be reversible. In a non-reversible embodiment, only one loop portion 43 or 44 is provided. It will be understood by those of ordinary skill in the art that the loop portions 43 and 44 and the body portion 41 may take a variety of shapes and sizes. All that is required is that loop portions 43 and/or 44 are accepted by slots 30 and slots 30 (and any slot extensions 31) are sized and shaped to accommodate and secure either or both loop portions 43 and 44.

As shown in FIG. 1, slots 30 (and any necessary extensions 31) accept either first loop 43 and/or second loop 44 (the first loop 43 is shown engaged in FIG. 1). If a different configuration of body portion 41 is desired, the food support element 40 may be reversed and slots 30 (and any necessary extensions 31) may accept second loop ends 44 (compare FIGS. 1 and 7). In this manner, food support element 40 is reversible. In addition, since either loop end 43 or 44 is simply inserted into slot 30, they may be easily removed for cleaning and both assembly and cleaning by the user are also simplified. As indicated, the size of slots 30 and the need for any extension 31 is determined by the size and shape of ends 42 and loops 43 and 44, as will fee understood by those of skill in the art.

Figure 4:
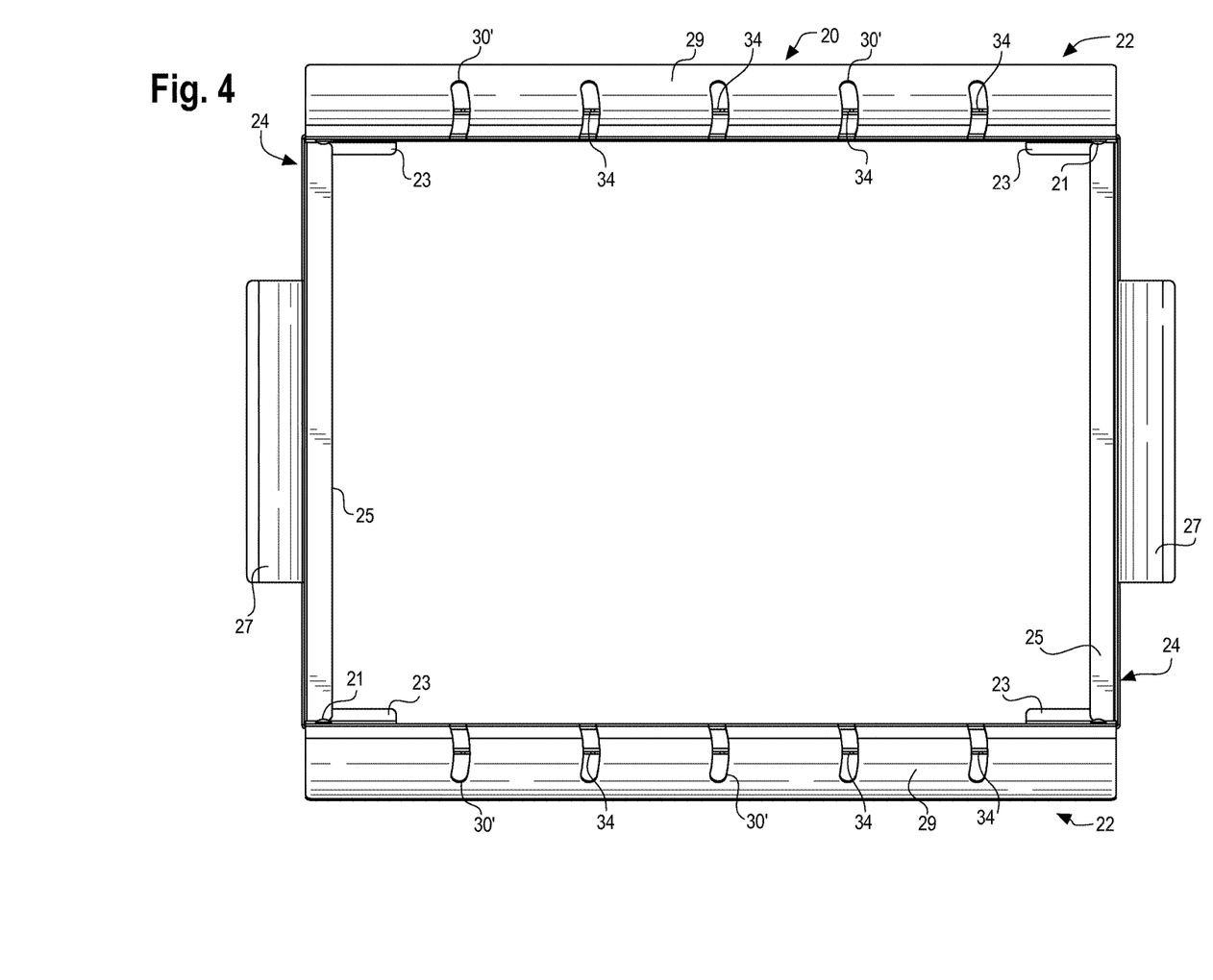
FIG. 4 is a top view of a frame of an alternative embodiment of a food support assembly of the present invention having a locking rail.

An alternative preferred embodiment 10 of the rack of the present inventions may be seen by reference to FIGS. 4-7. In this embodiment the same food support element 40 used with the embodiment of FIGS. 1-2 may also be used. Alternative frame 20 also includes two generally parallel side members 22 and two generally parallel end members 24 which may be attached together with rivets 21 or other well known means. Ends 24 are generally L-shaped and include a lower horizontal flange 25 and a vertical end member 26. A handle 21 may also be provided. Sides 22 include a generally vertical leg 28 and an upper horizontal flange 29 that projects outwardly from sides 22. A lower horizontal foot portion 23 may also be provided. A plurality of opposing slots 30' are provided on horizontal flange 29, and slots 30' may extend 31 to vertical leg 28 if necessary to accommodate the ends 42 of food support member 40. In this alternative embodiment, slots 30' are arcuate, preferably as shown in FIG. 4. Unlike the frame 20 embodiment of FIGS. 1-2, frame 20 of the alternative embodiment includes a locking rail 32 (FIGS. 5, 6 and 7) to more securely engage first loop portion 43 or second loop portion 44 of food support member 40.

Figure 5:
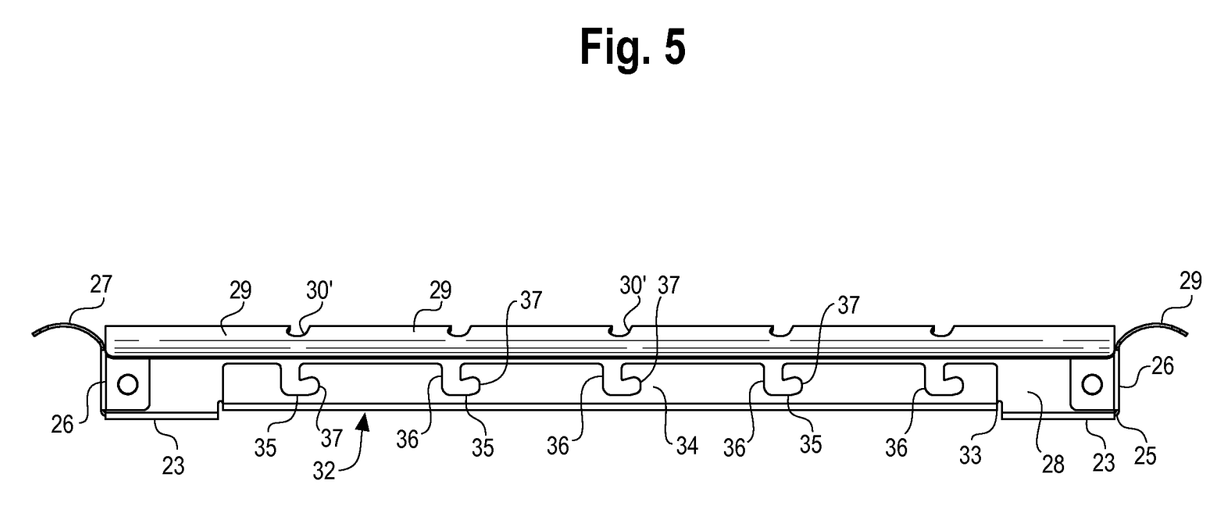
FIG. 5 is a side view of the frame of the alternative embodiment of the food support assembly of FIG. 4.
Figure 6:
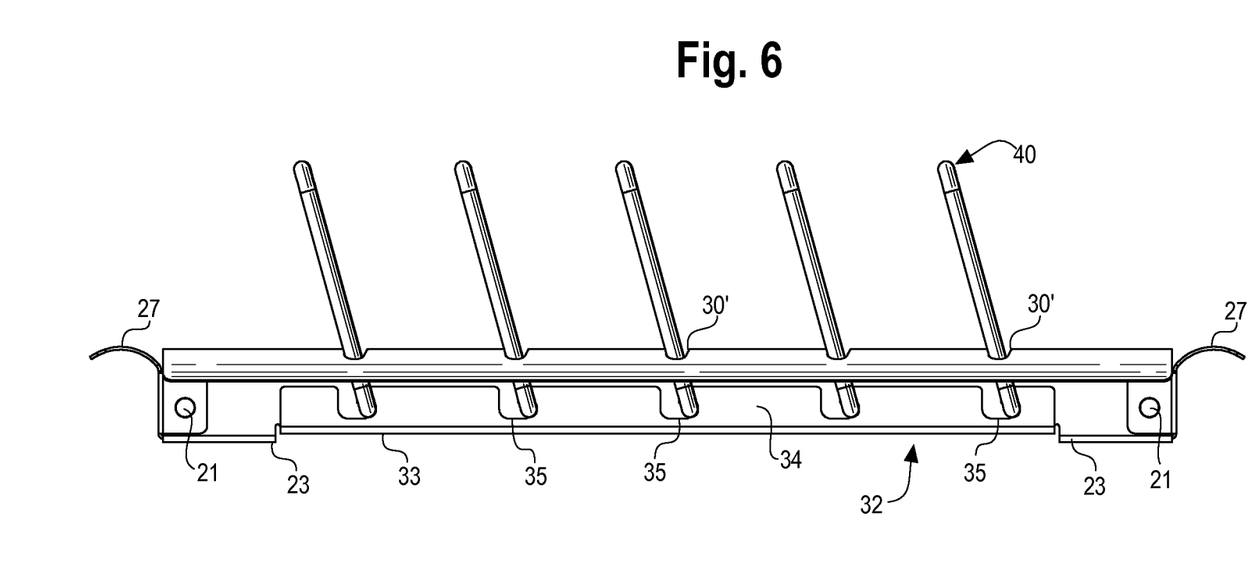
FIG. 6 is a side view of the alternative embodiment of a food support assembly of FIG. 4 showing a plurality of reversible food support members engaged in the book-shaped cut-outs of the locking rail in a representative angular orientation in the frame.
Figure 7:
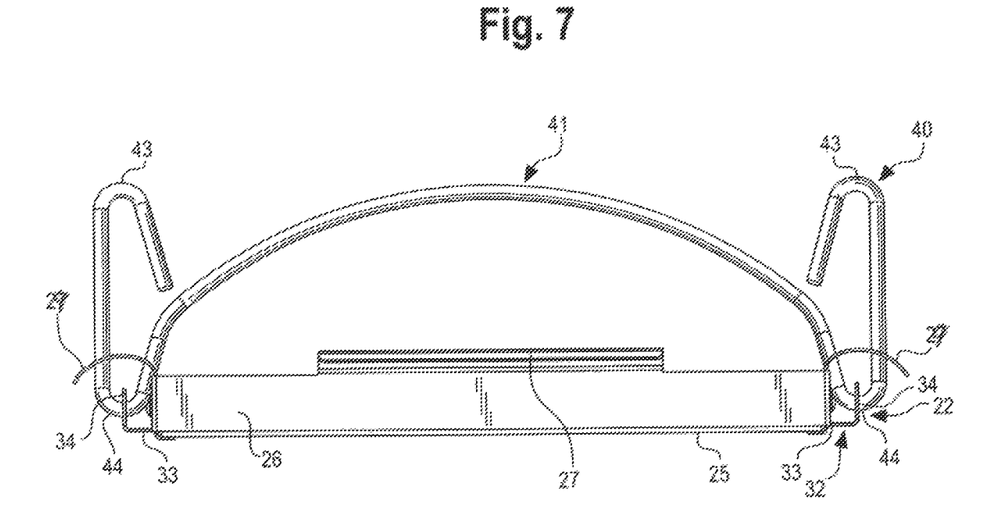
FIG. 7 is an end view of the alternative embodiment of the food support assembly of FIG. 6.

As indicated, each side member 22 of the alternative embodiment of frame 20 includes a locking rail 32. As shown in FIGS. 5, 6 and 7, preferred looking rail 32 is generally L-shaped and includes a horizontal portion 33 that is attached in vertical leg 21 of side member 22 and a vertical portion 34 that rims parallel to vertical leg 28 of side member 22. As shown in FIGS. 4, 6 and 7, vertical portion 34 is located below generally horizontal flange 29. Vertical portion 34 of locking nail 32 includes a plurality of hook-shaped cut-outs 35 (FIG. 5) having a vertical opening portion 36 that is generally aligned with arcuate slots 30' of horizontal flange 29 and recess portion 37. Hook-shaped cut-outs 35 coincide with the number of slots 30'.

As best shown in FIGS. 4 and 5, arcuate slots 30' are arced away from recess portion 37 of hook-shaped cut-outs 35 such that the top of the arc is in alignment with the vertical opening portion 36. Although not required, the preferred arcuate slots 30' enable the food support member 40 to be secured at a slight angle while loop portions 43 or 44 are engaged in recess portion 3 of hook-shaped cut-out 35 as shown in FIGS. 5 and 6. In use, the desired loop portion 43 or 44 is inserted through arcuate slot 305 and into hook-shaped cut-out 35. Because the slots 305 are arcuate, outer leg portion 45 and inner leg portion 46 of ends 42 of food support member 40 fit within the bottom of the arc such that food support member 40 may be angled once inserted through arcuate slots 30'. Loop portion 43 or 44 is then engaged in the recess portion 37 of book-shaped cut-out 35. Food support member 40 is then supported in frame 20 as shown in FIGS. 6 and 7.

It will be understood by those of skill in the art that although hook-shaped cut-outs 35 and arcuate slots 30' are preferred in this embodiment, they are not required. For example, cut-outs 35 do not have to be book-shaped, but instead, simply include a vertical opening portion 36 such that loop portion 43 or 44 are accepted therein. In this manner, food support member 40 is more securely supported on frame 22 than in an embodiment without locking rail 32 or its equivalents. If required, a portion of arcuate slot 30' may be extended 31 to vertical leg 28.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein is the singular, it will be understood that there are a plurality of Inventions as described and claimed.

Various features of the present inventions are set forth in the following claims.

What is claimed is:

1. A food support assembly for use on a cooking surface, comprising:
    a generally rectangular frame having two parallel side members and two parallel end members, each side member including an upstanding generally vertical leg and an upper generally horizontal flange, wherein each upper horizontal flange includes a plurality of opposing slots; and
    a plurality of food support members, each food support member having two opposing ends and a body portion between the two ends wherein each end of each food support member includes two loop portions, one being a top loop portion and the other being a bottom loop portion, each loop portion formed between an inner leg portion and an outer leg portion, and wherein the top and bottom loop portions are adapted for selective engagement by the opposing slots on the upper horizontal flange of each opposing side member.

2. A food support assembly for use in cooking, comprising:
    a frame having two sides and two ends, each of the sides including a substantially horizontal upper flange connected to a vertical leg, wherein each horizontal upper flange includes a plurality of opposing apertures;
    a plurality of food support members, each member having two opposing ends interconnected by a body portion, each end of each food support member having an inner leg portion and an outer leg portion, the inner and outer leg portions interconnected by an intermediate first loop portion and a second loop portion, wherein the food support member is secured to the side members of the frame by selectively inserting the first loop portions or second loop portion of each end of each food support member into the opposing apertures in the horizontal flanges of each side member; and
    a locking rail attached to and generally parallel with the vertical leg portion of each side member of the frame and positioned below the upper horizontal flanges, the locking rail having a vertical portion including openings aligned with the apertures on the horizontal flanges, the openings on the locking rail include a vertical opening and a recess portion to selectively engage the first loop portion or the second loop portion of each end of the food support members.

3. The invention of claim 2 wherein the apertures on the horizontal flanges are arcuate.

* * * * *

UNITED STATES PATENT AND TRADEMARK OFFICE
CERTIFICATE OF CORRECTION

PATENT NO.       : 9,730,553 B2
APPLICATION NO.  : 14/294314
DATED            : August 15, 2017
INVENTOR(S)      : Marilyn B. Bombard et al.

It is certified that error appears in the above-identified patent and that said Letters Patent is hereby corrected as shown below:

In the Specification
Column 1, Line 6: "Mare particularly" should read --More particularly--
Column 1, Line 14: "has became" should read --has become--
Column 2, Line 14: "looking rail" should read --locking rail--
Column 3, Lines 14-15: "book-shaped" should read --hook-shaped--
Column 3, Line 49: "sized so accommodate" should read --sized to accommodate--
Column 3, Line 51: "grids" should read --grills--
Column 3, Line 56: "holts or rivets" should read --bolts or rivets--
Column 3, Line 65: "A handle 2" should read --A handle 27--
Column 4, Line 21: "fond support members" should read --food support members--
Column 4, Line 59: "will fee understood" should read --will be understood--
Column 5, Line 3: "A handle 21" should read --A handle 27--
Column 5, Line 18: "looking rail" should read --locking rail--
Column 5, Line 20: "attached in vertical leg 21" should read --attached to vertical leg 28--
Column 5, Line 21: "that rims parallel" should read --that runs parallel--
Column 5, Line 24: "locking nail" should read --locking rail--
Column 5, Line 25: "shaped out-outs" should read --shaped cut-outs--
Column 5, Line 35: "recess portion 3" should read --recess portion 37--
Column 5, Line 37: "slot 305" should read --slot 30'--
Column 5, Line 38: "slots 305" should read --slots 30'--
Column 5, Line 43: "book-shaped" should read --hook-shaped--
Column 5, Line 49: "book-shaped" should read --hook-shaped--

In the Claims
Column 6, Line 45, Claim 2: "first loop portions" should read --first loop portion--

Signed and Sealed this
Third Day of October, 2017

Joseph Matal
*Performing the Functions and Duties of the*
*Under Secretary of Commerce for Intellectual Property and*
*Director of the United States Patent and Trademark Office*